US008473971B2

(12) United States Patent
Meijer et al.

(10) Patent No.: US 8,473,971 B2
(45) Date of Patent: Jun. 25, 2013

(54) TYPE INFERENCE AND TYPE-DIRECTED LATE BINDING

(75) Inventors: Henricus Johannes Maria Meijer, Mercer Island, WA (US); Brian C. Beckman, Newcastle, WA (US); David N. Schach, Redmond, WA (US); Amanda Silver, Seattle, WA (US); Paul A. Vick, Seattle, WA (US); Peter F. Drayton, Redmond, WA (US); Avner Y. Aharoni, Seattle, WA (US); Ralf Lammel, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1717 days.

(21) Appl. No.: 11/220,167

(22) Filed: Sep. 6, 2005

(65) Prior Publication Data

US 2007/0055978 A1 Mar. 8, 2007

(51) Int. Cl.
G06F 13/00 (2006.01)
G06F 9/45 (2006.01)
G06F 9/44 (2006.01)

(52) U.S. Cl.
USPC ........... 719/331; 717/140; 717/145; 717/148; 717/162

(58) Field of Classification Search
USPC .................. 719/331, 332; 717/140, 145, 148, 717/162
See application file for complete search history.

(56) References Cited

U.S. PATENT DOCUMENTS

| 5,485,615 | A | 1/1996 | Wennmyr |
| 5,500,881 | A | 3/1996 | Levin |
| 5,579,518 | A * | 11/1996 | Yasumatsu ..................... 717/131 |
| 5,687,377 | A | 11/1997 | Pasquariello |
| 5,692,195 | A * | 11/1997 | Conner et al. ................ 719/316 |
| 5,696,974 | A | 12/1997 | Agrawal |
| 5,742,828 | A * | 4/1998 | Canady et al. ................ 717/144 |
| 5,748,961 | A | 5/1998 | Hanna |
| 5,748,963 | A | 5/1998 | Orr |
| 5,842,220 | A | 11/1998 | De Groot et al. |
| 5,872,973 | A * | 2/1999 | Mitchell et al. ............... 719/332 |
| 5,983,021 | A * | 11/1999 | Mitrovic ........................ 717/158 |
| 6,018,628 | A | 1/2000 | Stoutamire |
| 6,023,583 | A | 2/2000 | Honda |
| 6,041,179 | A | 3/2000 | Bacon |
| 6,072,950 | A | 6/2000 | Steensgaard |
| 6,126,330 | A | 10/2000 | Knight |
| 6,134,708 | A | 10/2000 | Yui |
| 6,237,135 | B1 | 5/2001 | Timbol |
| 6,415,316 | B1 | 7/2002 | Van der Meer |
| 6,425,124 | B1 | 7/2002 | Tominaga et al. |
| 6,560,774 | B1 | 5/2003 | Gordon |

(Continued)

OTHER PUBLICATIONS

International Search Report dated Dec. 27, 2006 for PCT Application Serial No. PCT/US2006/031709, 3 Pages.

(Continued)

*Primary Examiner* — Andy Ho
*Assistant Examiner* — Phuong Hoang
(74) *Attorney, Agent, or Firm* — Workman Nydegger (57) ABSTRACT

Systems and methods that enhance and balance a late binding and an early binding in a programming language, via supplying an option component to opt-in (or opt-out) late binding, and wherein a late binding is triggered based on a static type for the variable (e.g., object or a type/string.) Additionally, the variable is enabled to have different static types at different regions (e.g., a program fragment) of the programming language.

20 Claims, 9 Drawing Sheets

U.S. PATENT DOCUMENTS

| | | | |
|---|---|---|---|
| 6,678,745 B1 * | 1/2004 | Hodge | 719/331 |
| 6,842,877 B2 | 1/2005 | Robarts | |
| 6,915,301 B2 * | 7/2005 | Hirsch | 707/102 |
| 6,928,425 B2 | 8/2005 | Grefenstette | |
| 6,957,394 B1 | 10/2005 | Fernandez | |
| 6,981,249 B1 | 12/2005 | Knoblock et al. | |
| 7,017,117 B2 | 3/2006 | Capps | |
| 7,051,322 B2 | 5/2006 | Rioux | |
| 7,120,897 B2 | 10/2006 | Ebbo | |
| 7,127,707 B1 | 10/2006 | Mishra | |
| 7,137,069 B2 | 11/2006 | Abbot | |
| 7,152,229 B2 * | 12/2006 | Chong et al. | 717/146 |
| 7,197,702 B2 | 3/2007 | Niyogi | |
| 7,246,361 B1 | 7/2007 | Scalora | |
| 7,389,498 B2 | 6/2008 | Meijer | |
| 7,730,448 B2 | 6/2010 | Meijer | |
| 7,818,729 B1 | 10/2010 | Plum et al. | |
| 7,958,493 B2 | 6/2011 | Lindsey | |
| 2002/0016953 A1 | 2/2002 | Sollich | |
| 2002/0095657 A1 | 7/2002 | Vaidyanathan | |
| 2002/0095658 A1 | 7/2002 | Shulman | |
| 2003/0023957 A1 | 1/2003 | Bau | |
| 2003/0079199 A1 | 4/2003 | Barsness | |
| 2003/0097648 A1 | 5/2003 | Allison | |
| 2003/0131347 A1 * | 7/2003 | Allison | 717/165 |
| 2004/0098731 A1 | 5/2004 | Demsey | |
| 2005/0004973 A1 | 1/2005 | Snover | |
| 2005/0081139 A1 | 4/2005 | Witwer | |
| 2005/0086360 A1 * | 4/2005 | Mamou et al. | 709/232 |
| 2005/0091531 A1 | 4/2005 | Snover | |
| 2005/0114771 A1 | 5/2005 | Piehler | |
| 2005/0198177 A1 * | 9/2005 | Black | 709/206 |
| 2005/0278695 A1 | 12/2005 | Synovic | |
| 2006/0015817 A1 | 1/2006 | Fioretti | |
| 2006/0026559 A1 | 2/2006 | Gunturi | |
| 2006/0031263 A1 | 2/2006 | Arrouye | |
| 2006/0173911 A1 | 8/2006 | Levin | |
| 2006/0206391 A1 | 9/2006 | Delson | |
| 2007/0256060 A1 | 11/2007 | Ryu | |
| 2008/0320444 A1 | 12/2008 | Meijer | |
| 2008/0320453 A1 | 12/2008 | Meijer | |

OTHER PUBLICATIONS

Wright, et al., "A Practical Soft Type System for Scheme", 1994, ACM, p. 250-262.

Pnizzi, et al., "On the Return Types of Virtual Functions", 1999, ACM, p. 37-42.

Stan Schultus. Language Enhancements in Visual Basic 2005. Oct. 2004. http://msdn2.microsoft.com/en-us/library/ms379584(vs.80).aspx. (14 pages).

Andy D. Pimentel. A Case for Visualization-integrated System-level Design Space Exploration (10 pages). Available at least as early as Dec. 31, 2005.

eWay Ltd, http://www.eway.co.uk/interdevtricks.html#Intellisense Workarounds., available at least as early as Dec. 31, 2000. (3 pages).

U.S. Appl. No. 11/766,347, Apr. 3, 2012, Office Action.
U.S. Appl. No. 11/201,507, Sep. 3, 2008, Office Action.
U.S. Appl. No. 11/201,507, Mar. 23, 2009, Office Action.
U.S. Appl. No. 11/201,507, Feb. 22, 2010, Notice of Allowance.

Author Unknown, Theme Development, http://codex.wordpress.org/User:JPAUL/Theme_Development, Available at least as early as Mar. 30, 2007 (12 pages).

Ravikumar Raja, Themes in ASP.NET 2.0., Aug. 26, 2006 (14 pages).

U.S. Appl. No. 11/766,345, Mar. 1, 2012, Office Action.

Office Action dated Aug. 2, 2012 cited in U.S. Appl. No. 11/766,345.

Fritz Henglein, "Efficient Type Inference for Higher Order Binding-Time Analysis", May 1991, FPCA conference, pp. 1-23 <Henglein91.pdf>.

Office Action dated Nov. 26, 2012 cited in U.S. Appl. No. 11/766,345.

Notice of Allowance mailed Sep. 19, 2012 cited in U.S. Appl. No. 11/766,347.

* cited by examiner

TYPE INFERENCE AND TYPE-DIRECTED LATE BINDING

BACKGROUND

As programming approaches and foundations have evolved, application programming interfaces (APIs) and programming schemas have been developed to standardize and unify programming methodologies that were previously multi-variant and relatively incompatible. Modern programming therefore often involves employing APIs and schemas in conjunction with reusable libraries. Such Programming languages continue to evolve to facilitate specification by programmers as well as efficient execution.

Compilers and/or interpreters bear the burden of translating high-level logic into executable machine code. In general, compilers and/or interpreters are components that receive a program specified in a source programming language (e.g., C, C#, Visual Basic, Java...) and convert the logic provided thereby to machine language that is executable by a hardware device. However, the conversion need not be done verbatim. In fact, conventional compilers and/or interpreters analyze the source code and generate very efficient code. For example, programmers write code that sets forth a logical flow of operations that is intuitive and easy for humans to understand, but is often inefficient for a computer to execute. Compilers and/or interpreters can identify inefficiencies and improve program performance at the hardware level by eliminating unnecessary operations and/or rearranging the execution of instructions while still achieving the intended results. In this manner, programmers can create robust and efficient software.

Programming languages include static languages and dynamic languages. A static language requires most program structure—such as the types of variables and function arguments—to be determined at compile time. The compiler can detect errors and optimize performance at the cost of run-time flexibility. On the other hand, dynamic languages allow a user to make more run-time changes to program structure, such as passing arguments of different types to the same function and, in some languages, defining new types or classes. A dynamic environment can enable run-time definition and linking.

In general, type inference is a language mechanism that facilitates writing correctly typed applications for programmers. Consider the following:

Dim X="Hello"

as a Visual Basic statement that both declares the variable X and initializes its value to the string "Hello". The compiler is aware that the type of the right-hand side is String. Accordingly, the compiler can infer that the type of the variable ought to be X. Currently, the compiler sets the type of X to "Object", the most general type in the language, and employs late binding to resolve later code like "X.Length( )", which is only legal for type String.

Late binding refers to an operation wherein the compiler inserts code to look up the method "Length" at run time. Such ability to late-bound over member names is especially important in data-intensive programs where the structure of the data is not known statically, and for writing generic interpretative code. Nonetheless, late binding, while very flexible, can sometimes introduce run-time cost and reduce design-time hints in the user interface (e.g., when employing an assist provider such as Intellisense®.) Such can hinder flexibility of the programming languages.

Therefore, there is a need to overcome the aforementioned exemplary deficiencies associated with conventional systems and devices.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject innovation provides for systems and methods that balance a late binding and an early binding in a programming language, via supplying an option component to opt-in (or opt-out) late binding, and wherein a late binding is triggered based on a static type for the variable (e.g., object or a type/string.) A type inference component is implemented in the programming language, and appropriate late bound helpers can be called (e.g., XML late bound helper for values of XML type; reflection late bound helper for objects, and the like), to type direct the late binding. As such, late binding can be triggered based on type specified for the variable. The option component can include a smart tag or similar refactoring mechanism to enable a user to choose "as string" or "as object" and specify not only whether late binding is desired or not, but also type of late binding, for example. The late binding can be the default scenario for the programming language and the user can opt out. Alternatively, the programming language can include non-late binding as the default, wherein the user can then opt in. Additionally, in context of Visual Basic (VB) syntax, the smart tag can expand when clicked upon to indicate the type explicitly, wherein the variable declaration is already available.

According to a further aspect of the subject innovation, a variable can have different static types at different regions (e.g., a program fragment) of a programming language. Moreover, an analysis can be performed to identify the type of variable at different segments of a program, or identify a set of possible types for the variable. Such can mitigate an early commitment of a type, and if a type may be acceptable, a check can be provided at later time. A feed back warning (as opposed to an error) can also be provided to the user regarding changed types for a variable. Such can provide flexibility to a user, and a same variable name can be used in several occasions throughout a programming code, for example.

In a related methodology, a user can initially select whether late binding is desired or not. Subsequently, the user can designate desired types of late binding. Moreover, different types of late binding can be supplied depending upon the static type of the variable (e.g., inferred from a usage thereof). Accordingly, a balance between early binding and late binding can be created, wherein the checking can be relaxed at run time, and information available regarding static types employed at compile time.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Also, the word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term computer program as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Figure 1:
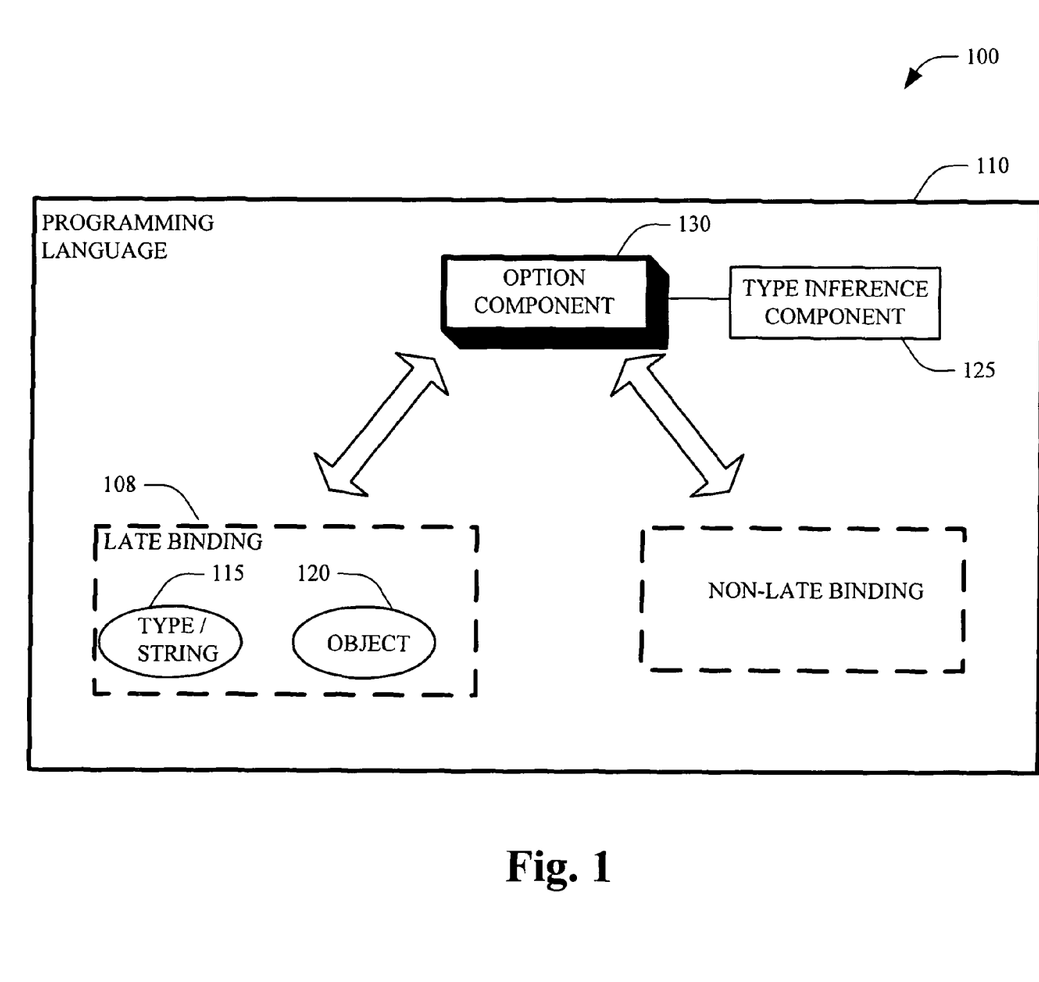
FIG. 1 illustrates an option component as part of an enhanced programming environment of the subject innovation.

Turning initially to FIG. 1, a programming environment 100 is illustrated, and a programming language 110 (e.g., Visual Basic) enhanced via employing an option component 130. The option component 130 enables a user to opt-in to (or opt-out of) late binding 108, and wherein a late binding is triggered based on a static type designated for the variable (e.g., a variable can be assigned a specific static type 115 or object 120.) A type inference component 125 is implemented in the programming language, wherein such type component 125 can designate types of expressions and variables, given a typically inevitable lack of complete type information. As such, a balance between a late binding and an early binding in the programming language can be provided, wherein appropriate late bound helpers can be called (e.g., XML late bound helper for XML; reflection late bound helper for objects, and the like), to type direct the late binding.

As illustrated, the type inference component 125 can supply a compiler (not shown) with missing type information based on contextual information of an input data stream. The option component 130 can further include a smart tag or similar refactoring mechanism, as described in detail infra, which enables a user to choose between the precise inferred type or object and, specify not only whether late binding is desired or not, but also type of late binding, for example. The late binding can be the default scenario for the programming language 110 and the user can opt out. Alternatively, the programming language 110 can include non-late binding as the default, wherein the user can then opt in. Moreover, in context of Visual Basic (VB) syntax, the smart tag can expand when clicked upon to indicate the type explicitly, wherein the variable declaration is already available, for example.

Figure 2:
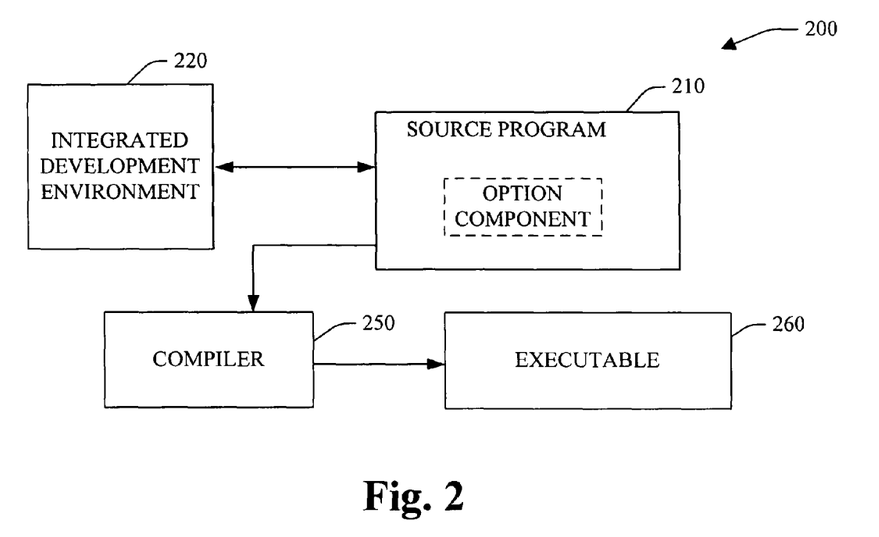
FIG. 2 illustrates a programming environment for type inference and type directed late binding.

Referring initially to FIG. 2, a programming environment 200 for type inference and type directed late binding, as described in detail infra, is illustrated. The system 200 includes a source program 210 that is developed, designed, or edited by an Integrated Development Environment 220 (IDE). The IDE 220 can be associated with a more elaborate programming station such as a developer studio application, or associated with a more basic tool such as a code text editor, for example. In general, the option component enables a user to opt-in (or opt-out) late binding and wherein a static type for a variable can be assigned a precise inferred type or object. A compiler 250 processes the source program according to well-known compilation techniques and in view of the type directed late binding to produce executable code for a computer at 260.

Typically, the ability to late-bound over member names is especially important in data-intensive programs where the structure of the data is not known statically and to write generic interpretative code. In general binding refers to the way in which a programming code such as Visual Basic code accesses. There exist two types of binding with which Visual Basic employs, namely early binding and late binding.

In general, when the target of the expression can be deferred until run time, such deferring processing is referred to as late binding. Late binding allows Object variables to be used in a typeless way, where all resolution of members is based on the actual run-time type of the value in the variable. If strict semantics are specified by the compilation environment, late binding causes a compile-time error. Non-public members can be ignored when performing late binding, including for the purposes of overload resolution. Moreover, unlike the early-bound case, invoking or accessing a Shared member late bound will cause the invocation target to be evaluated at run time.

Figure 3:
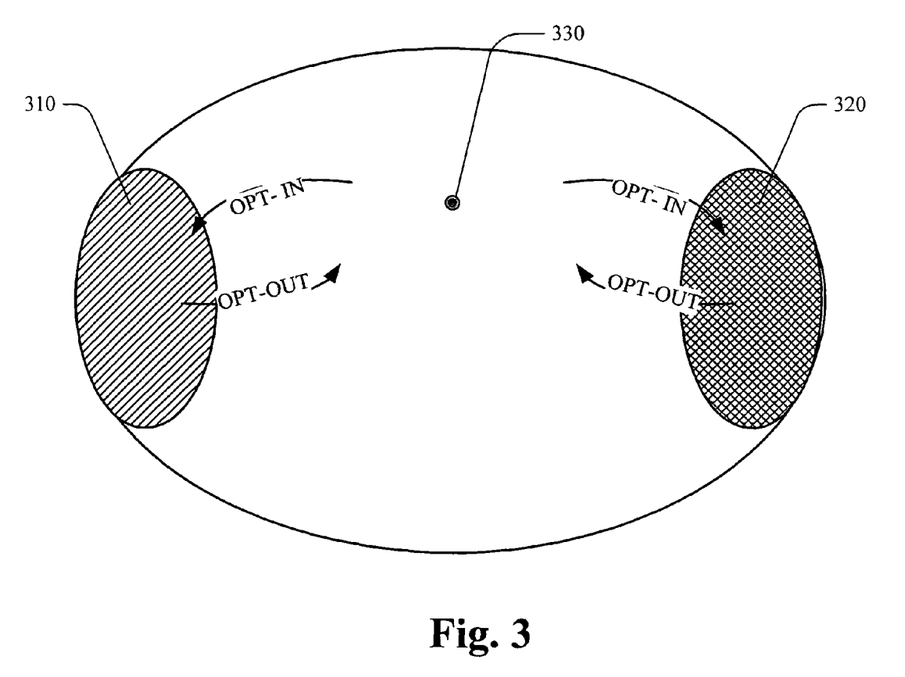
FIG. 3 illustrates a schematic illustration of static type representation of a variable according to the subject innovation, and a comparison thereof with conventional approaches.

FIG. 3 illustrates a schematic illustration for a comparison of static type representation of a variable according to the subject innovation, when compared to conventional approaches. For example, in conventional static programming language represented by area 310, a variable has the same static type throughout the programming language. As such, in a conventional static programming language usage of a variable needs to be determined and a type that is consistent with usage of a variable being designated (e.g., a super-type).

Likewise, area 320 represents the conventional approach for dynamic languages, wherein all values are typed as object. In such dynamic languages, the dynamic language does not possess knowledge regarding a static type of a variable.

The subject innovation, in one exemplary aspect relates to the middle ground 330, wherein opting—in and opting out (e.g., of regions 310 and 320) and different forms of late bindings are supplied depending on the static type of the value. Thus, a variable can accept different static types at different regions of the program (e.g., a variable with a changing static type), and a type inferred based on use of the variable. As such, different program fragment can contain different static types (or sets) for the same variable. For example at compile time, a variable can accept a static type of integer or button, as a set of possibilities. Such is in contrast to conventional static programming languages, wherein the variable typically accepts exactly one static type everywhere in the programming language.

Figure 4:
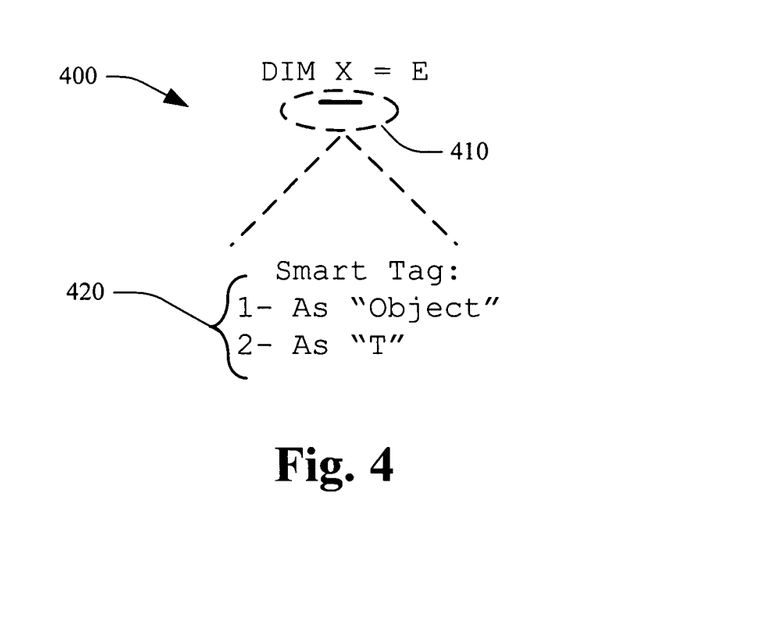
FIG. 4 illustrates a smart tag implementation in accordance with an exemplary aspect of the subject innovation.

FIG. 4 illustrates a smart tag-based refactoring in accordance with an exemplary aspect of the subject innovation. Considering the example 400 illustrated in FIG. 4, wherein a user types the following declaration into a VB program:

DimX=E wherein the type of expression E is known to the compiler to be T. In accordance with one aspect of the subject innovation, VB can display a "smart tag" 410 underneath the X in the VS IDE, for example. The smart tag 410 can function as an interactive graphical element. Accordingly, if the user clicks or hovers over the smart tag 410, a drop-down menu of options 420 appears. The two options illustrated in this case will be "T" and "Object".

In general, if the user selects T, then the user is opting-in for static type inference, meaning that in later code, the type of variable X will be T. Specifically, an assist provider, Intellisense®, for the dot operator on X, written "X.", will display the known list of fields and methods for type T. Alternatively, selecting "Object" from the smart-tag drop-down menu means that the user is opting-in for standard VB late binding over Object. As such, the compiler and IDE will not know the specific list of fields and methods for X, so the dot operator will not display an assist provider (e.g., Intellisense®) hints and the compiler must generate code to select fields and methods at runtime (via a meta-object protocol implemented through reflection).

Typically, the assist provider (not shown) supplies intelligent programmatic assistance (e.g., Intellisense ®) for a particular programming language (e.g., Visual Basic, C#, C++, Java, J# ...). Such assist provider components therefore, can be provided by specific language development entities (e.g., software companies, universities, individuals...). The assist provider component can simplify coding, for example, aiding programmers in statement, class, and function completion by providing suggestions based on programmatic context. These suggestions can be provided via pop-up windows or boxes, drop-down windows, and the like. For example, suggestions can be made for completing a partially specified word or statement based on its previous specification in the same or different compilation unit.

It is to be appreciated that late binding is typically not to be construed as the opposite of static typing. The type T, statically known, may require late binding over its domain. For example, when the user types:

Dim X=<book><title>"Lions, Tigers, and Bears"</title></book>

The static type of X can be "XElement", which offers a kind of late binding to the actual terms in the XML. Specifically, "X.book.title" will be a legal code, and in general will only be fully resolved at run time. Thus, Intellisense® may be capable of displaying hints when the user types "X."—if there is an XSD schema in scope, but the binding to "book" and "title" is late, that is, completed only at run time. Such mix of statically known type (XElement) and dynamically known bindings (X.book, X.book.title) can be referred to as Type-Directed Late Binding.

Moreover, when the user opts in for either static typing or late binding over Object, then the IDE can rewrite the code using the IDE's pretty lister to denote the selected type. For example, if the user opts-in for T, the IDE can replace:

Dim X=E with

Dim X As T=E and, if the user opts-in for Object, the IDE can replace

Dim X=E with

Dim X As Object=E

Subsequent to such pretty listing, the smart tag for opting in can disappear.

In addition, in the context of the following code:

```
Dim X = "Hello"
...
X = 5
``` and assuming that the user opts-in for type String rather than Object at the declaration site—then, the pretty lister can rewrite the above combination as:

```
Dim X As String = "Hello"
...
X = Ctype(5,String)
``` wherein explicit calls to built-in type-conversion functions can be inserted pursuant to the inferred type. Moreover, since not all type conversions are legal or meaningful, type inference can help the compiler and runtime identify nonsensical code. For example;

```
Dim X As Integer = 5
...
X = Ctype("Hello",Integer)
``` is not meaningful, whereas

X=IntegerHash("Hello")

or

X=Ctype("37", Integer)

is meaningful.

Additionally, if "Option Strict" is ON, the user can in general be required to opt-in before compilation can proceed. Alternatively, If "Option Strict" is OFF, then late binding to Object will be the default selected for every case where the user has not opted in.

Moreover, in certain circumstances, it is not necessary to declare every variable before employing it. For example, if the first appearance of the variable X in a program is the assignment "X=5", then the compiler can infer that the type of variable X is Integer. Similarly, the IDE can display a smart tag with a drop-down menu offering the options "Integer" and "Object". The following code can be considered as an example:

```
IF someBooleanExpression THEN
    X = 5
ELSE
    X = "Hello"
END IF
```

For this example, it is assumed that such code is the first appearance of the variable X in the program. The standard flow analysis in the compiler is aware that control can go either way in the branch, so it can inform type inference that the type of X can be any of Integer, String, or Object. As a matter of convenience to the user, the smart tag with these three options can appear under the first X in the branch. Moreover, Pretty listing can insert explicit calls to built-in type-conversion functions consistently with the opted-in type. If the user chose String above, then the pretty lister will rewrite the combination as:

```
IF someBooleanExpression THEN
    X = Ctype(5,String)
ELSE
    X = "Hello"
END IF
```

The default type for undeclared variables can be Object, and thus if the first use of the variable X is not in an inferable context, then its type shall be inferred to be Object.

Figure 5:
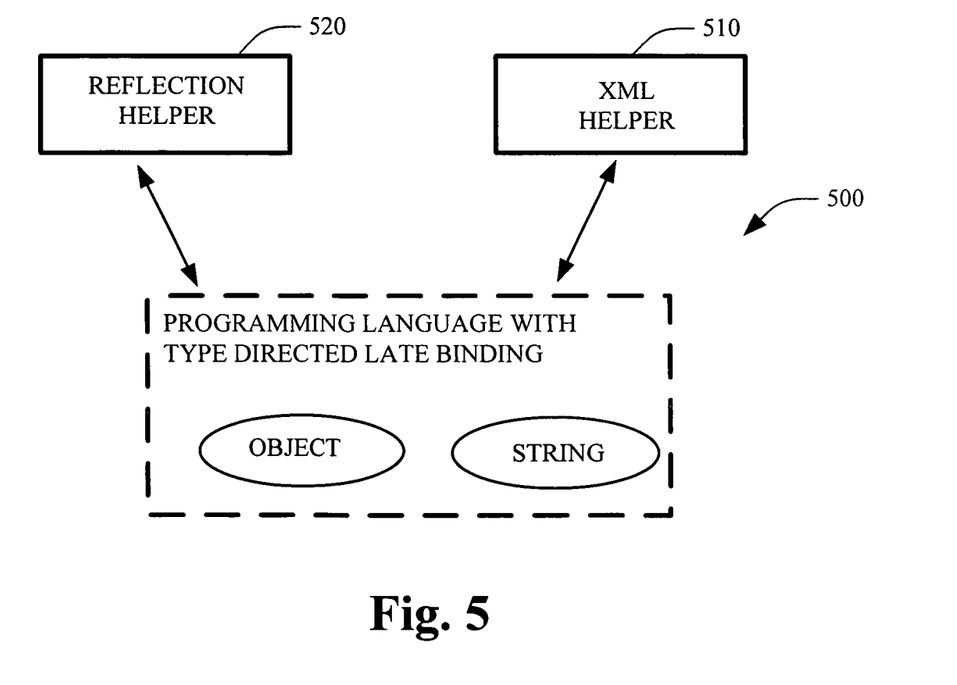
FIG. 5 illustrates a programming environment with appropriate helpers employed based on type of late binding.

FIG. 5 illustrates a programming environment 500, in accordance with an aspect of the subject innovation. Based on the selection of object 520 or string 515, appropriate helpers can be called such as the XML late bound helper 510 for XML and reflection late bound helper 520 for objects, to type direct the late binding, in accordance with an aspect of the subject innovation.

Figure 6:
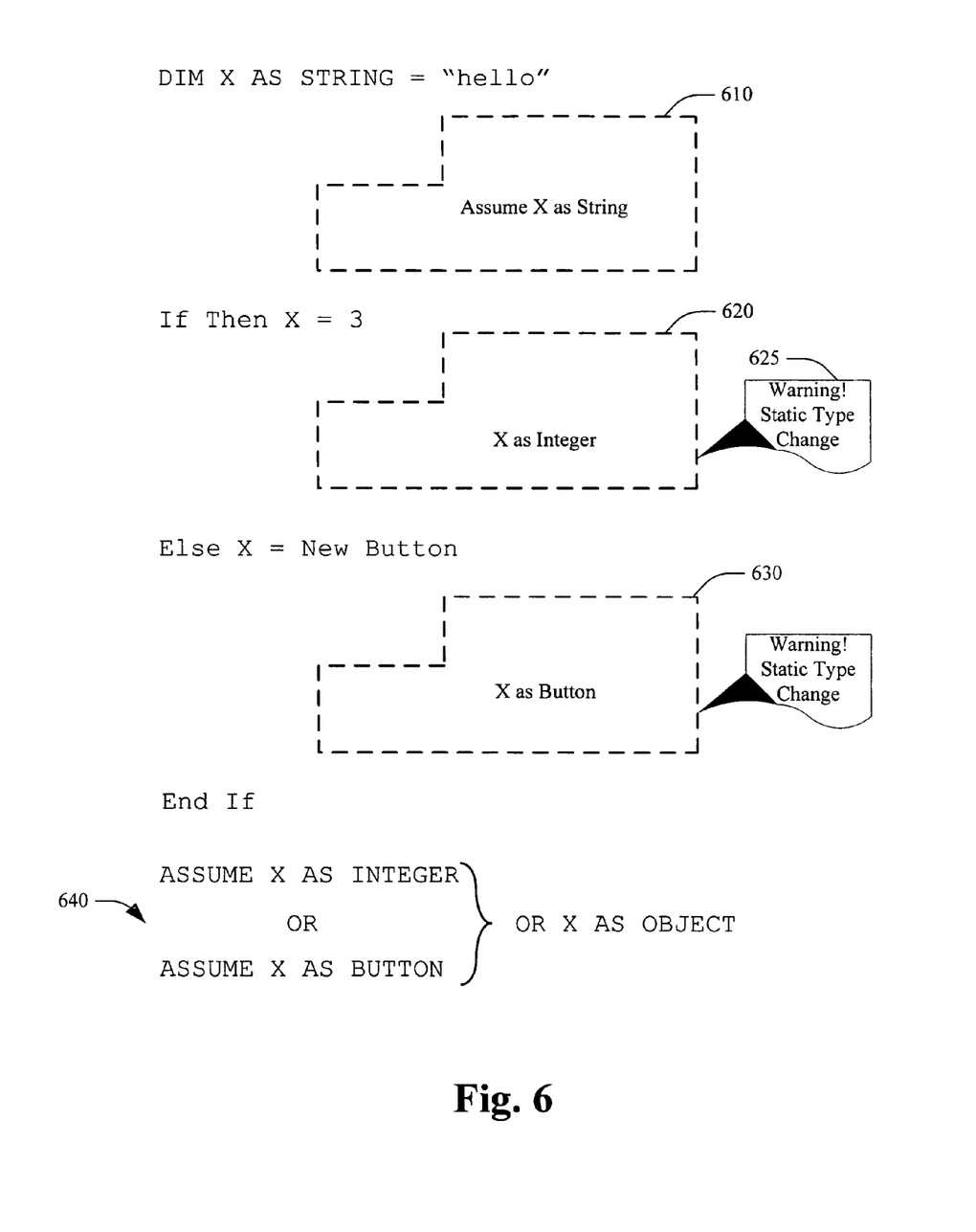
FIG. 6 illustrates fragments of a code wherein a variable can have different static types (e.g., as set of types) at different regions.

Referring now to FIG. 6, fragments of a code wherein a variable can have different static types (e.g., as set of types) at different regions is illustrated. Such can provide flexibility for different regions, without an early commitment to a particular type. If the type may be acceptable, permission is then granted to employ the type and a later check verifies the accuracy. In contrast, conventional static programming languages issue an error in such circumstances. As illustrated, at 610 the variable X assumes a static type of a string, wherein, Intellisense® checking can also be supplied. Subsequently and at 620, X can be an integer and local knowledge regarding the type of X is employed. A feed back to the user can be provided in form of a warning 625, regarding such change. Thereafter and at 630, X can assume a button. At 640, and after the End If, X can be an integer or button (and not a string). The compiler can now track the type, as it has knowledge that X is an integer or button, and can assume either one. Alternatively, X can be designated as on object, instead of a more precise tracking. Such enables identifying regions of a program wherein the types of a variable (or a precise prescription) are known.

As a further example, the following code can be considered:

```
Dim X = "Hello"
...
X = 5
```

At the site of the assignment "X=5", the IDE can display another smart tag, permitting the user to opt-in for a type shift. Under the scheme proposed above, this code would be automatically rewritten as:

```
Dim X As String = "Hello"←statement 1, declaration
... region 1, X has type String ...
X = Ctype(5,String)←statement 2
... region 2, X has type String ...
```

The IDE can typically maintain a smart tag under X at statement 2, allowing the user to opt-in for type Integer, String, or Object in region 2.

Figure 7:
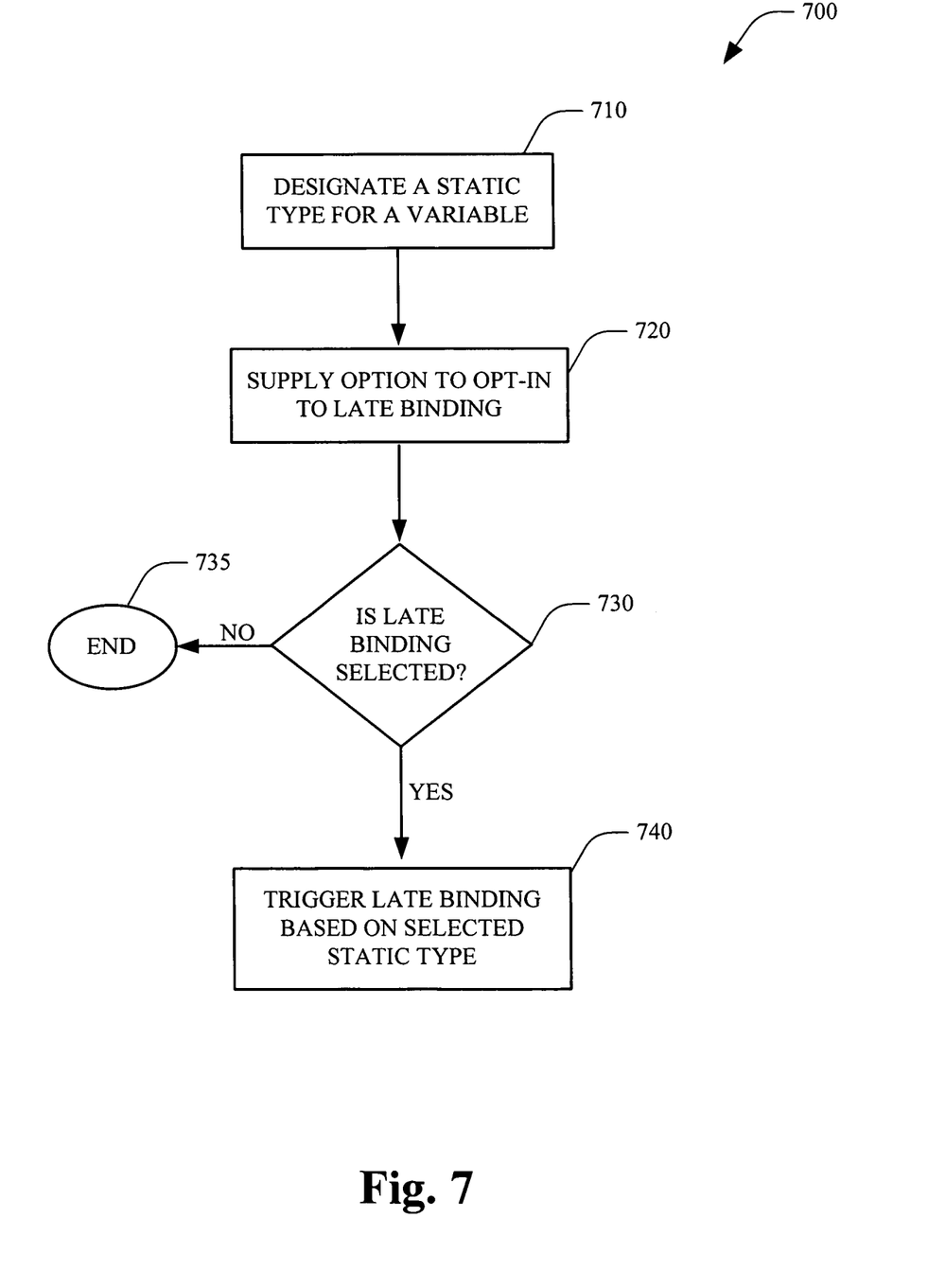
FIG. 7 illustrates an exemplary methodology of type directed late binding in accordance with an aspect of the subject innovation.

FIG. 7 illustrates an exemplary methodology 700 in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 710, a static type for a variable can be designated. Subsequently, and at 720 an option to opt-in for late binding is presented to user. If the late binding option is selected at 730, the methodology 700 proceeds to 740, wherein the late binding is triggered based on the selected static type. Alternatively, if the user does not select the option of late binding, then the methodology can end at 735.

Figure 8:
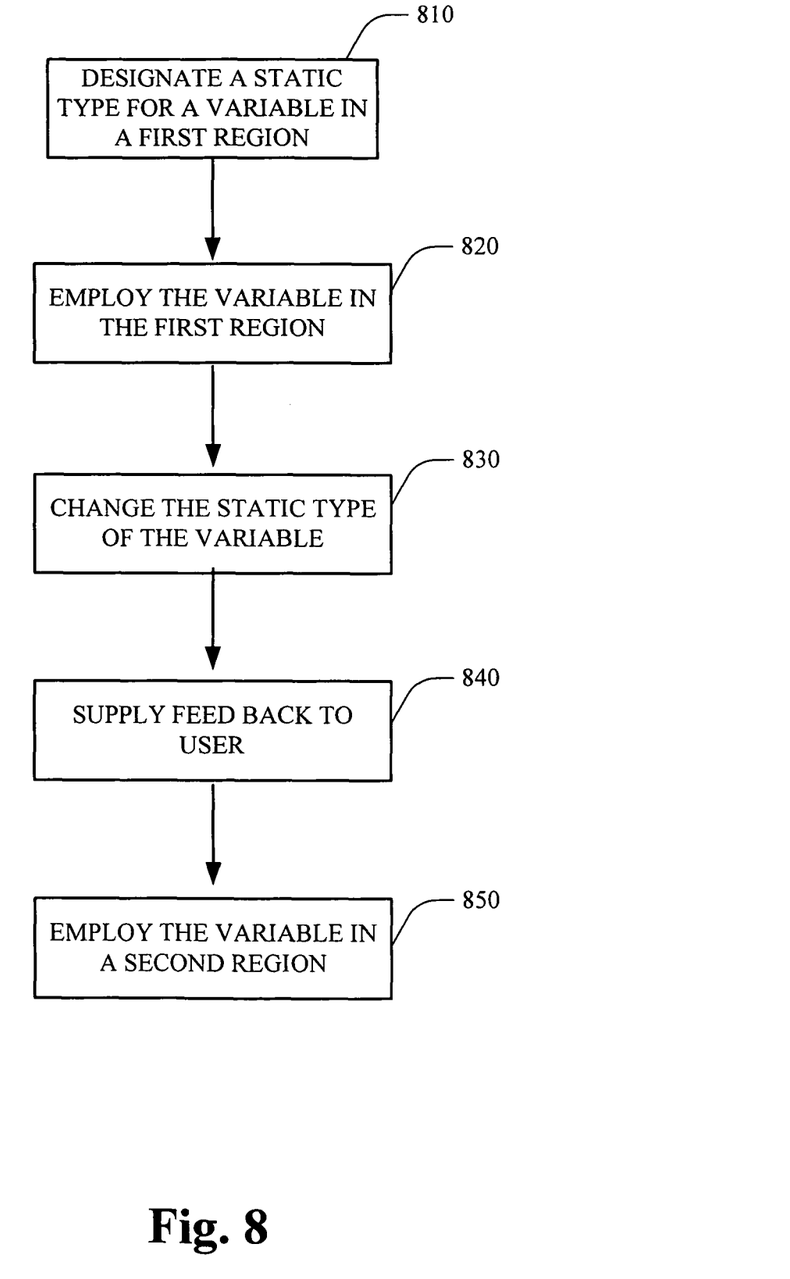
FIG. 8 illustrates a further exemplary methodology in accordance with the subject innovation.

FIG. 8 illustrates a further exemplary methodology in accordance with the subject innovation. Initially, and at 810 a static type for a variable can be designated at 810 in a first region of a programming code. Subsequently and at 820, the variable can be employed in the first region of the code. At 830, the static type of the variable can be changed to a different type, e.g., a variable with a changing static type. A feed back can be provided to the user regarding such change at 840. At 850 the static type can then be employed in a second region of the programming code. As such, fragments of a code can exist wherein a variable can have different static types (e.g., as set of types) at different regions. Such can provide flexibility for different regions, without an early commitment to a particular type for the variable.

Figure 9:
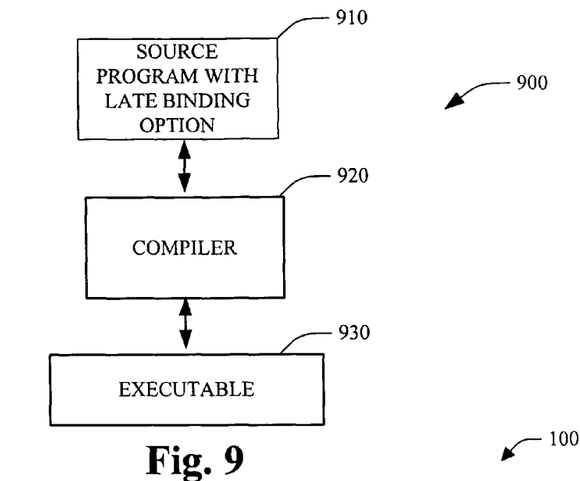
FIG. 9 illustrates a programming environment with a source program that supports a programming language with type inference and type directed late binding.

FIG. 9 illustrates a programming environment 900 with a source program 910 that supports a programming language with type inference and type directed late binding. Such can balance a late binding and an early binding in a programming language, via supplying opt-in (or opt-out) of late binding. The system 900 includes a source program 910 that can be developed, designed, or edited by an Integrated Development Environment (IDE). The IDE can be associated with a more elaborate programming station such as a developer studio application for example, or associated with a more basic tool such as a code text editor, for example. A compiler 920 processes the source program according to well-known compilation techniques to produce executable code 930 for a computer.

Figure 10:
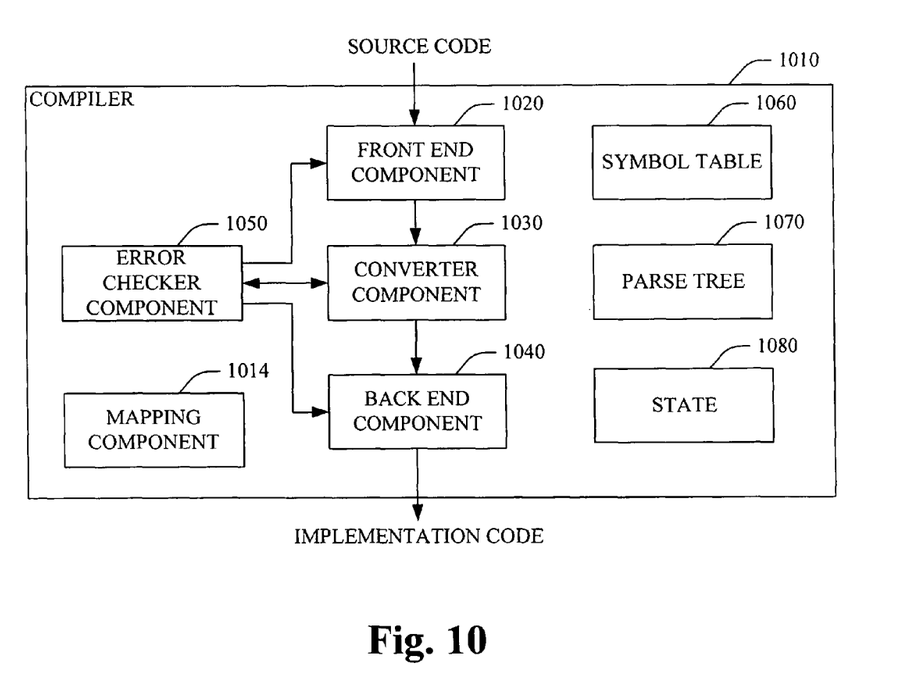
FIG. 10 is a block diagram depicting a compiler environment that can be utilized to implement type directed late binding of the subject innovation.

FIG. 10 is a block diagram depicting a compiler environment 1000 that can be employed to implement late binding options of the subject innovation. The compiler environment 1000 includes a compiler 1010 including a mapping component 1014, a front-end component 1020, a converter component 1030, a back-end component 1040, an error checker component 1050, a symbol table 1060, a parse tree 1070, and state 1080. The compiler 1010 accepts source code as input and can produce implementation code as output. The input can include but is not limited to programmatic expressions as described herein. The relationships amongst the components and modules of the compiler environment illustrate the main flow of data. Other components and relationships are not illustrated for the sake of clarity and simplicity. Depending on implementation, components can be added, omitted, split into multiple modules, combined with other modules, and/or other configurations of modules.

The compiler 1010 can accept as input a file having source code associated with processing of a sequence of elements. The source code may include various expressions and associated functions, methods and/or other programmatic constructs. The compiler 1010 can process source code in conjunction with one or more components for analyzing constructs and generating or injecting code.

A front-end component 1020 reads and performs lexical analysis upon the source code. In essence, the front-end component 1020 reads and translates a sequence of characters (e.g., alphanumeric) in the source code into syntactic elements or tokens, indicating constants, identifiers, operator symbols, keywords, and punctuation among other things.

The converter component 1030 parses the tokens into an intermediate representation. For instance, the converter component 1030 can check syntax and group tokens into expressions or other syntactic structures, which in turn coalesce into statement trees. Conceptually, these trees form a parse tree 1070. Furthermore and as appropriate, the converter module 1030 can place entries into a symbol table 1030 that lists symbol names and type information used in the source code along with related characteristics.

A state 1080 can be employed to track the progress of the compiler 1010 in processing the received or retrieved source code and forming the parse tree 1070. For example, different state values indicate that the compiler 1010 is at the start of a class definition or functions, has just declared a class member, or has completed an expression. As the compiler progresses, it continually updates the state 1080. The compiler 1010 may partially or fully expose the state 1080 to an outside entity, which can then provide input to the compiler 1010.

Based upon constructs or other signals in the source code (or if the opportunity is otherwise recognized), the converter component 1030 or another component can inject code corresponding to facilitate efficient and proper execution. Rules coded into the converter component 1030 or other component indicates what must be done to implement the desired functionality and identify locations where the code is to be injected or where other operations are to be carried out. Injected code typically includes added statements, metadata, or other elements at one or more locations, but this term can also include changing, deleting, or otherwise modifying existing source code. Injected code can be stored as one or more templates or in some other form. In addition, it should be appreciated that symbol table manipulations and parse tree transformations can take place.

Based on the symbol table 1060 and the parse tree 1070, a back-end component 1040 can translate the intermediate representation into output code. The back-end component 940 converts the intermediate representation into instructions executable in or by a target processor, into memory allocations for variables, and so forth. The output code can be executable by a real processor, but output code that is executable by a virtual processor can also be provided.

Furthermore, the front-end component 1020 and the back end component 1040 can perform additional functions, such as code optimization, and can perform the described operations as a single phase or in multiple phases. Various other aspects of the components of compiler 1010 are conventional in nature and can be substituted with components performing equivalent functions. Additionally, at various stages during processing of the source code, an error checker component 1050 can check for errors such as errors in lexical structure, syntax errors, and even semantic errors. Upon detection error, checker component 1050 can halt compilation and generate a message indicative of the error.

Figure 11:
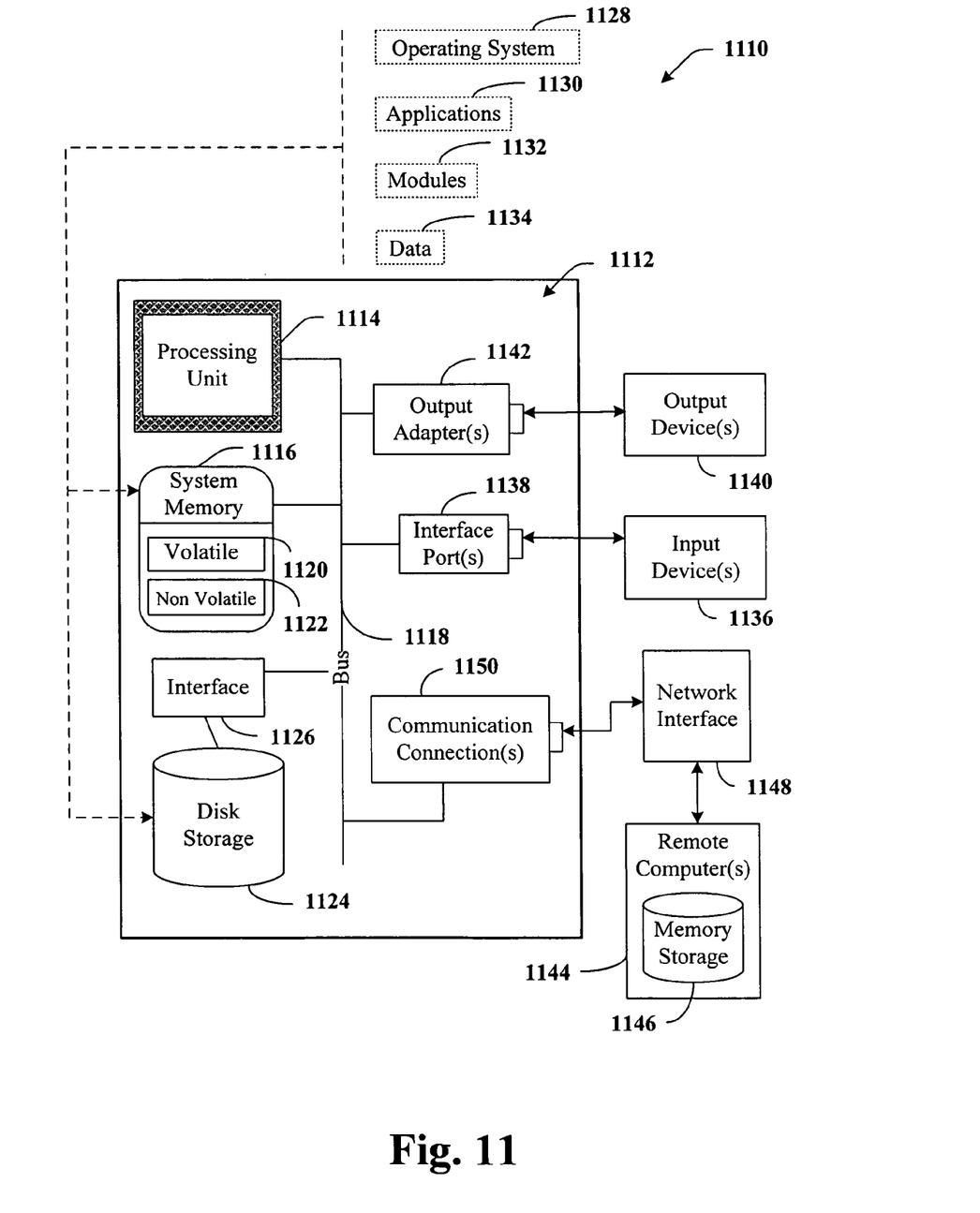
FIG. 11 illustrates an exemplary environment for implementing various aspects of the subject innovation.
Figure 12:
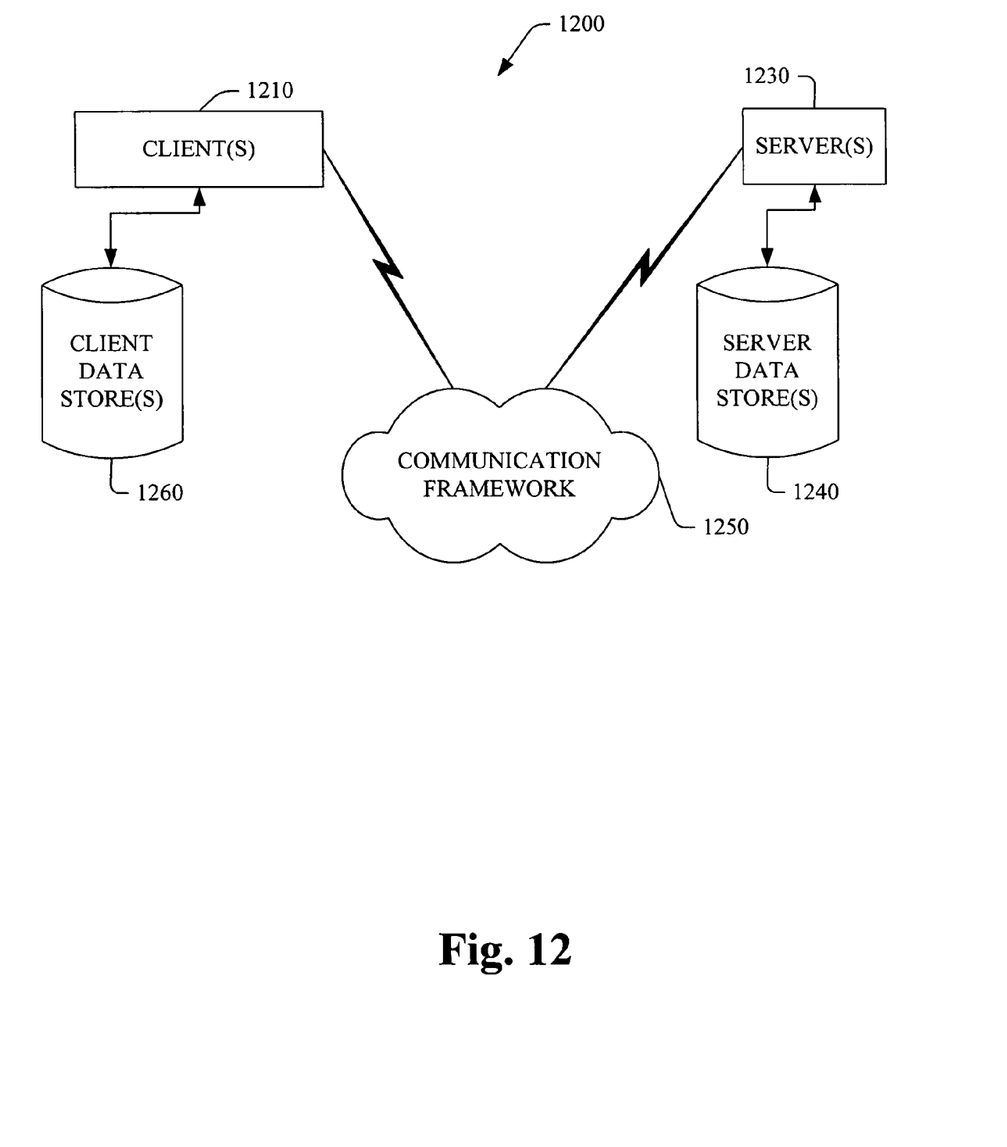
FIG. 12 is a schematic block diagram of an additional-computing environment that can be employed to implement the subject innovation.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, etc. that perform particular tasks and/or implement particular abstract data types. Moreover, those skilled in the art will appreciate that the innovative methods can be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 11, an exemplary environment 1110 for implementing various aspects of the subject innovation is described that includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that various components described herein can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112! The hardware/software necessary for connection to the network interface 1148 includes, for exemplary purposes only, internal and external technologies such as, modems including regular telephone grade modems, cable modems and DSL modems, ISDN adapters, and Ethernet cards.

FIG. 12 is a schematic block diagram of a sample-computing environment 1200 that can be employed for the optional late binding in accordance with an aspect of the subject innovation. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The servers 1230 can house threads to perform transformations by employing the components described herein, for example. One possible communication between a client 1210 and a server 1230 may be in the form of a data packet adapted to be transmitted between two or more computer processes. The system 1200 includes a communication framework 1250 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the servers 1230.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system comprising:
    at least one processor that executes the following computer executable components stored on a memory;
    an option component that supplies an option, to a user, prior to compiling at least a portion of software code in the computing system, the software code portion including at least one variable of a changeable static type, allowing the user to determine whether to opt-in to use late binding during compilation of the software code portion, whether to opt-out of and not use the late binding during compilation of the software code portion, and determine what type of late binding to implement for the at least one variable within the software code portion, the option component associated with a programming language in which the software code portion was written, and wherein the at least one variable has one static type in one software code region and the same at least one variable has a different static type in another software code region; and
    a helper that facilitates the late binding, the late binding based at least in part on a type specified or inferred for a variable of the programming language.

2. The system of claim 1, the variable is compatible with a changing static type in the programming language.

3. The system of claim 2, the changing static type inferred based at least in part on a use of the variable or a location of the variable in a code region of the programming language.

4. The system of claim 1, wherein the late binding is type-directed late binding that late binds at least one statically known type and at least one dynamically known binding in a statement at run-time.

5. The system of claim 1, the helper is an XML late bound helper for a type that represents an XML object model.

6. The system of claim 1, the helper is a reflection late bound helper for objects.

7. The system of claim 1, the option component comprising a refactoring mechanism to designate precise inferred type or object for the variable.

8. The system of claim 7, the refactoring mechanism expands a declaration to indicate a type explicitly.

9. The system of claim 7, the refactoring mechanism employs a drop down menu of available options, comprising the option, and to indicate object and type, the drop down menu drops down to open the menu in response to a hover or click associated with the refactoring mechanism.

10. The system of claim 9, selection of an object indicative of opting for the late binding over the object.

11. A method comprising:
    employing at least one processor executing computer executable instructions stored on a memory to implement the following acts:
    supplying a user with an option, prior to compiling at least a portion of software code in a computing system, the software code portion including at least one variable of a changeable static type, that allows the user to determine whether to opt-in to utilize late binding during compilation of the software code portion, whether to opt-out and utilize non late binding and determine what type of late binding to implement on the software code portion during compilation of the software code portion associated with a programming language in which the software code portion was written,
        wherein the type for variables with changeable static types is inferred based on the use of the variable,
        wherein the at least one variable has one static type in one software code region and the same at least one variable has a different static type in another software code region, and
        wherein the option to opt-in or opt-out allows the same at least one variable name to be used with different static types in a plurality of different software code segments of the software code portion;
    determining that one of the late binding is to be utilized or the non late binding is to be utilized based at least in part on an indication regarding the option obtained from the user;
    performing the one of the late binding or the non late binding based at least in part on the determination;
    inferring a type of a variable; and
    changing a static type of the variable as part of the programming language.

12. The method of claim 11 further comprising inferring the changing static type based at least in part on usage of the variable.

13. The method of claim 11 further comprising changing the static type based at least in part on location of the variable in the programming language.

14. The method of claim 11 further comprising designating type of late binding for the programming language.

15. The method of claim 11 further comprising supplying a feed back to the user upon changing the static type.

16. The method of claim 11 further comprising tracking a variable type via a compiler.

17. The method of claim 11 further comprising triggering the late binding based at least in part on selected static type.

18. The method of claim 11 further comprising employing a refactoring mechanism that expands to designate a type explicitly.

19. The method of claim 11 further comprising identifying regions for a code of the programming language that have a precise prescription of types.

20. A computer system comprising:
    at least one processor that executes the following computer executable components stored on a memory;
    means for providing an option, to a user, prior to compiling at least a portion of software code in the computing system, the software code portion including at least one variable of a changeable static type, allowing the user to both determine whether to opt in or opt out of a late binding during compilation of the software code portion for a programming language in which the software code portion was written and determine what type of late binding to implement on the software code portion, wherein the type for variables with changeable static types is inferred based on the use of the variable, and wherein the at least one variable has one static type in one software code region and the same at least one variable has a different static type in another software code region;

means for performing the late binding when the an indication relating to the option is obtained and indicates to opt in to the late binding;

means for inferring a type of a variable; and means for changing a static type for the variable in the programming language.

* * * * *